(12) United States Patent
Kula

(10) Patent No.: US 11,907,189 B2
(45) Date of Patent: Feb. 20, 2024

(54) EVENT-DRIVEN COMPUTER MODELING SYSTEM FOR TIME SERIES DATA

(71) Applicant: TD Ameritrade IP Company, Inc., Omaha, NE (US)

(72) Inventor: John Scott Kula, Sinking Spring, PA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 267 days.

(21) Appl. No.: 16/987,356

(22) Filed: Aug. 6, 2020

(65) Prior Publication Data
US 2022/0043790 A1  Feb. 10, 2022

(51) Int. Cl.
| | |
|---|---|
| G06F 16/00 | (2019.01) |
| G06F 16/21 | (2019.01) |
| G06F 16/23 | (2019.01) |
| G06Q 40/06 | (2012.01) |

(52) U.S. Cl.
CPC ........ *G06F 16/219* (2019.01); *G06F 16/2322* (2019.01); *G06F 16/2358* (2019.01); *G06Q 40/06* (2013.01)

(58) Field of Classification Search
CPC .............. G06F 16/219; G06F 16/2322; G06F 16/2358; G06Q 40/06; G06Q 40/02
USPC .................................................. 707/600–899
See application file for complete search history.

(56) References Cited

U.S. PATENT DOCUMENTS

| | | | |
|---|---|---|---|
| 10,585,882 B1* | 3/2020 | Lintilhac | G06F 16/9024 |
| 11,169,980 B1* | 11/2021 | Revach | G06F 16/2282 |
| 2007/0027787 A1* | 2/2007 | Tripp | G06Q 40/06 705/36 R |
| 2010/0153298 A1* | 6/2010 | Fulshaw | G06Q 10/10 715/833 |
| 2010/0211519 A1* | 8/2010 | Giannetti | G06Q 40/04 709/212 |
| 2011/0320340 A1* | 12/2011 | Falconer | G06Q 40/06 705/38 |
| 2014/0188763 A1* | 7/2014 | Willis | G06Q 40/06 705/36 R |
| 2015/0161733 A1* | 6/2015 | Emsbo-Mattingly | G06Q 40/06 705/36 R |
| 2016/0063631 A1* | 3/2016 | Wootton | G06Q 40/06 705/36 R |

(Continued)

*Primary Examiner* — Michelle N Owyang
(74) *Attorney, Agent, or Firm* — Harness, Dickey & Pierce, P.L.C.

(57) ABSTRACT

A system stores instructions including, in response to receiving user input, identifying a first event type and a first security identifier and obtaining a first set of event dates from the event database and, for each event date of the first set of event dates, obtaining a corresponding event value on the corresponding event date of the first security identifier. The instructions include, for a first day related to each event date of the first set of event dates: obtaining a corresponding value on the first day of the first security identifier, determining a corresponding difference value between the corresponding event value and the corresponding value, and storing the corresponding difference value in a set of difference values. The instructions include calculating an average difference on the first day using the set of difference values and displaying the average difference and an event indicator corresponding to the first event type.

20 Claims, 6 Drawing Sheets

(56) References Cited

U.S. PATENT DOCUMENTS

2017/0109820 A1\* 4/2017 Baker .................... G06T 11/206
2018/0204285 A1\* 7/2018 Nadler ................. G06Q 10/067
2021/0200760 A1\* 7/2021 Bui ....................... G06F 16/248

\* cited by examiner

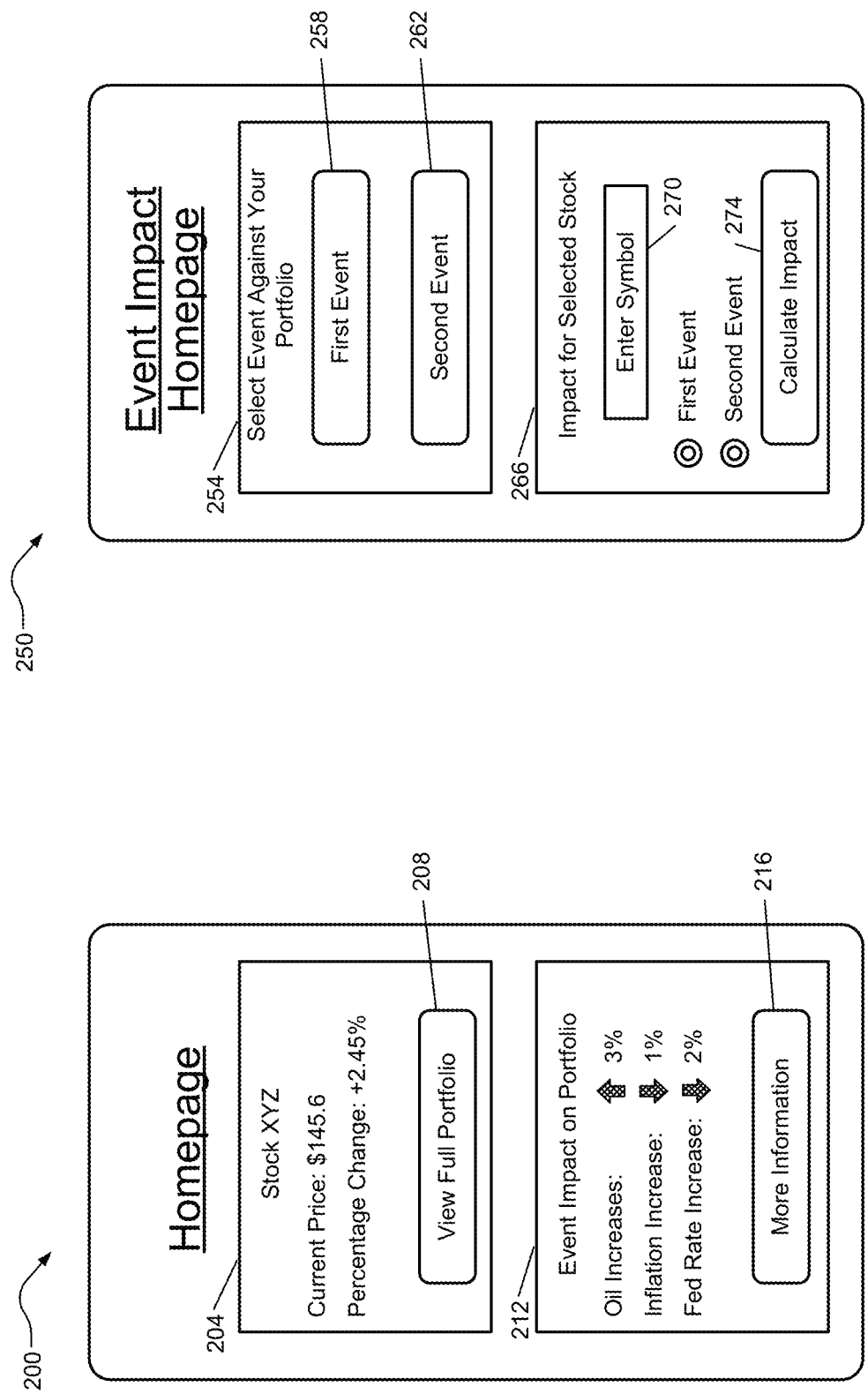

My Account: Overview

| Balances ▽ | Combined accounts 👤 | Current ⬌ | Abnormal Returns | ⊕ Link/Add Acct |

Account value
$55,047.71  ⬆ $414.07 (0.76%)   Account: 1234   Show ⚙

Market Snapshot

Update: S&P 500, Nasdaq on cusp of records as Powell defends rate path
MarketWatch    2:52 pm ET

Your Portfolio Against Common Market Events

| Oil price rises ⬇ 3% | Inflation expectations rises ⬇ 1% | Stock market volatility rises ⬆ 4% |
| 10-year U.S. Treasury rate rises ⬇ 2% | U.S. large cap stocks fall ⬇ 5% | See more events ... |

FIG. 3

EVENT-DRIVEN COMPUTER MODELING SYSTEM FOR TIME SERIES DATA

FIELD

The present disclosure relates to analyzing database entries and more specifically analyzing database entries to estimate a time-series value change.

BACKGROUND

While there are many methods to estimate the long term gains and losses in a portfolio or across a set of securities, there are no easy methods to determine how an extreme event may impact a portfolio in the short term. Without this information, a user cannot determine exposure in anticipation of, during, or as a result of these events. Further, the user does not have the opportunity to protect themselves against certain events, including both events that are predictable and unpredictable.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a memory coupled to the at least one processor. The memory stores a historical performance database including values associated with dates and corresponding to security identifiers, an event database including a set of event types and, for each event type of the set of event types, a set of event dates, and instructions for execution by the at least one processor. The instructions include, in response to receiving user input, identifying, from the user input, a first event type and a first security identifier. The instructions include obtaining, based on the first event type, a first set of event dates from the event database.

The instructions include, for each event date of the first set of event dates, obtaining, from the historical performance database, a corresponding event value on the corresponding event date of the first security identifier. The instructions include, for a first day related to each event date of the first set of event dates: obtaining, from the historical performance database, a corresponding value on the first day of the first security identifier, determining a corresponding difference value between the corresponding event value and the corresponding value, and storing the corresponding difference value in a set of difference values. The instructions include calculating an average difference on the first day using the set of difference values and displaying, on a user device, the average difference and an event indicator corresponding to the first event type.

In other features, the instructions include obtaining, from the historical performance database, a beginning value of the first security identifier and an end value of the first security identifier and calculating a normal difference as the end value less the beginning value. In other features, the instructions include determining an additional return value as the normal difference less the average difference and, in response to the additional return value being nonzero, displaying, on the user device, the additional return value.

In other features, the instructions include, in response to the additional return value being zero, displaying an indication on the user device that the additional return value is equal to the normal difference.

In other features, the instructions include determining a corresponding average difference for each day of a date range related to each event date of the first set of event dates and storing the corresponding average difference for each day of the date range in a set of average differences. In other features, the instruction identifying a value indicating a largest change from the set of average differences and determining the additional return value as the normal difference less the value. In other features, the instructions include, in response to the additional return value being nonzero, displaying, on the user device, the additional return value.

In other features, the date range corresponds to the first event type. In other features, the date range includes a pre-event date range and a post-event date range. In other features, the first security identifier includes: (i) a stock, (ii) an option, or (iii) an exchanged-traded fund.

In other features, the memory stores a user parameter database including a set of security identifiers corresponding to a user of the user device. In other features, the first security identifier includes each security identifier of the set of security identifiers.

In other features, the event type includes: (i) a change in commodity value, (ii) a change in interest rate value, or (iii) an occurrence of a natural disaster. In other features, receiving the user input includes receiving an indication of a user logging in to an account, identifying the first security identifier as a security included in a corresponding user portfolio, and identifying the first event type as a preset event type.

A method includes, in response to receiving user input, identifying, from the user input, a first event type and a first security identifier. The method includes obtaining, based on the first event type, a first set of event dates from an event database. The event database includes a set of event types and, for each event type of the set of event types, a set of event dates. The method includes, for each event date of the first set of event dates, obtaining, from a historical performance database, a corresponding event value on the corresponding event date of the first security identifier. The historical performance database includes values associated with dates and corresponding to security identifiers.

The method includes, for a first day related to each event date of the first set of event dates, obtaining, from the historical performance database, a corresponding value on the first day of the first security identifier. The method includes determining a corresponding difference value between the corresponding event value and the corresponding value and storing the corresponding difference value in a set of difference values. The method includes calculating an average difference on the first day using the set of difference values and displaying, on a user device, the average difference and an event indicator corresponding to the first event type.

In other features, the method includes obtaining, from the historical performance database, a beginning value of the first security identifier and an end value of the first security identifier. In other features, the method includes calculating a normal difference as the end value less the beginning value, determining an additional return value as the normal difference less the average difference, and, in response to the additional return value being nonzero, displaying, on the user device, the additional return value.

In other features, the method includes, in response to the additional return value being zero, displaying an indication on the user device that the additional return value is equal to the normal difference.

In other features, the method includes determining a corresponding average difference for each day of a date range related to each event date of the first set of event dates and storing the corresponding average difference for each day of the date range in a set of average differences. In other features, the method includes identifying a value indicating a largest change from the set of average differences and determining the additional return value as the normal difference less the value. In other features, the method includes, in response to the additional return value being nonzero, displaying, on the user device, the additional return value.

In other features, the date range corresponds to the first event type. In other features, the date range includes a pre-event date range and a post-event date range. In other features, the first security identifier includes: (i) a stock, (ii) an option, or (iii) an exchanged-traded fund.

In other features, the method includes storing a set of security identifiers corresponding to a user of the user device in a user parameter database. In other features, the first security identifier includes each security identifier of the set of security identifiers.

In other features, the event type includes: (i) a change in commodity value, (ii) a change in interest rate value, or (iii) an occurrence of a natural disaster. In other features, receiving the user input includes receiving an indication of a user logging in to an account, identifying the first security identifier as a security included in a corresponding user portfolio, and identifying the first event type as a preset event type.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 2A-2B are representations of an example user interface presenting example screens of an event modeling system.

FIG. 3 is a representation of an example user interface presenting an example account overview screen of an event modeling system.

In the drawings, reference numbers may be reused to identify similar and/or identical elements.

DETAILED DESCRIPTION

Figure 1:
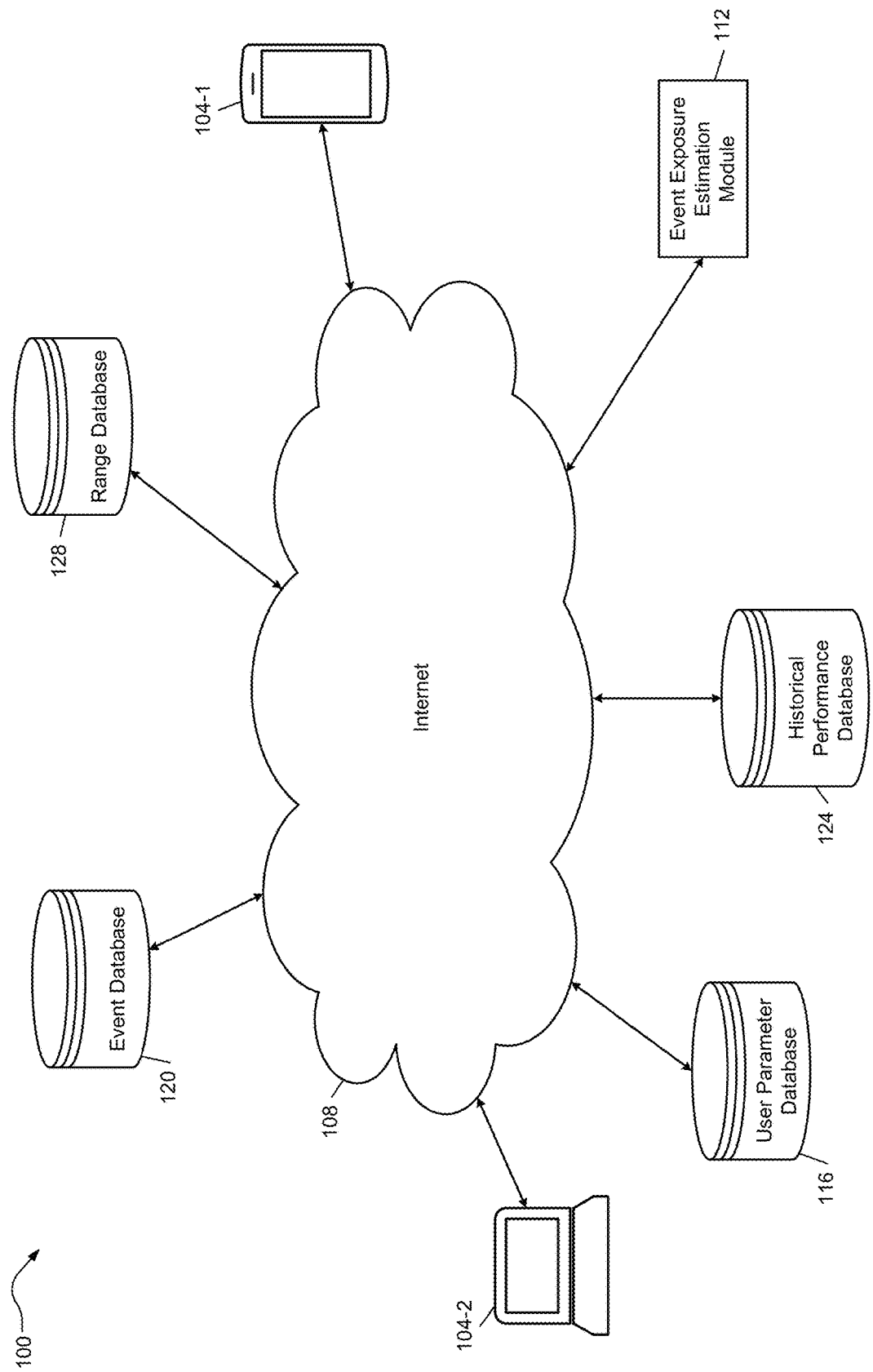
FIG. 1 is a high-level example block diagram of an event modeling system.

An event modeling system estimates the effects of events on time series data based on a machine model trained by prior event effects. The modeled effects may be financial, such as the amount of return (whether positive or negative) of a particular investment attributable to a certain event. In other words, for an investment with an expected rate of return, the system may model how that expected rate of return is modified by occurrence of a particular event. The differential created by the particular event may be referred to as an abnormal return.

The effects of an event may occur in a window that extends both before and after the event itself—for example, these events may include scheduled events such as a scheduled corporate earnings report, a scheduled meeting of the Federal Reserve Board to set the discount rate, etc. For unscheduled, unexpected events, such as a natural disaster or commencement of hostilities, the effects of the event will generally occur in a window that does not extend prior to the event. However, the period before such an unscheduled event may be analyzed to identify apparent effects of the event, which might indicate some foreknowledge (or at least opportune predictions) of the event by certain actors.

According to the present disclosure, events may be defined in varying levels of granularity. For example, instead of a scheduled meeting of the Federal Reserve Board to set the discount rate representing a single type of event, groupings of rate changes made at those meetings may be different events. For example, a Federal Reserve Board meeting where the rate was increased by a quarter point is one type of event, while a Federal Reserve Board meeting where the rate was increase by a half point may be a different type of event. Further examples of events are certain movements of oil prices, certain changes in inflation, occurrence of natural disasters, scheduled presidential elections, and certain changes in metrics, such as reported job creation numbers, stock indices, consumer price index (CPI), etc.

Each type of event may be associated with a time window over which effects are observed. The window may be defined as a number of days prior to the event and a number of days subsequent to the event. In various implementations, the number of days measures days when a relevant stock market is open (market days) rather than calendar days. In some instances, the window may vary depending on what effects are of interest—as a hypothetical example only, the effects of a particular event on corporate stocks may occur over a shorter window than the effects of that event on U.S. government treasury bonds.

An event modeling system of the present disclosure may be configured to estimate an abnormal return for an event over a set of one or more financial instruments, such as stocks, exchange-traded funds, options, etc. For example, the set of financial instruments may be chosen according to a particular investor's current investment portfolio or a hypothetical investment portfolio. In various implementations, the set of financial instruments may be chosen according to an institution's holdings in order to assess risk.

A user of the event modeling system may assess the abnormal return on the set of financial instruments in advance of an actual event in order to estimate risk and potentially to identify counter-positions. For example, if the event modeling system estimates a large negative abnormal return in response to a certain event, the user may create a hypothetical portfolio position to reduce that abnormal return. The user may then submit the hypothetical portfolio position to the event modeling system to estimate the efficacy of the change in the portfolio.

In some situations, the user may predict a particular event (such as a certain movement in a stock index on a particular date) and use the event modeling system to identify a point within the associated time window where the abnormal return is the greatest with respect to a particular set of financial instruments. This point in time may allow the user to place a trade, exercise an option, etc. to maximize the abnormal return (with the assumption that the event will occur as predicted).

In some situations, the event may have already occurred, but the time window for its effects has not yet ended. Then, the user may identify when an abnormal return can be maximized within the remaining portion of the time window. While the ability to increase gains or reduce losses may be reduced once an event has already occurred and everyone is aware of its occurrence, the event modeling system may provide estimates to generate the best abnormal return within these limited guidelines.

In general, the event modeling system may provide users the advantage of understanding and learning how certain events could impact their portfolio, allowing users to hedge against or take advantage of those events. For example, when a user logs in to their account, a section on the homepage may include estimated abnormal returns of the user's portfolio for one or more common events, such as the federal interest rate increasing. Moreover, providing users with tools to better understand their portfolio, especially with portfolio-specific potential benefits or risks, may encourage users to become more engaged in trading.

Using historical data, the event modeling system obtains financial instrument performance associated with previous occurrences of each event. To estimate the abnormal return, the event modeling system determines a set of previous dates when the federal interest rates increased by, for example, 0.25%. Then, for each of the set of dates, the event modeling system obtains closing prices for each stock in the user's portfolio during a time range around each of the set of dates.

The time range is event-specific and captures how long before and after the event does the event have effects that may result in abnormal returns. The time range may be expressed as a pair of integers—the first corresponding to the number of days prior to the event with the second corresponding to the number of days following the event. In various implementations, either of the numbers may be zero, though a common scenario is for the first number to be zero for unexpected events (like a natural disaster with no forewarning). The number of days may be market days or calendar days.

From the closing prices, the event modeling system can determine, for each day of the time range, a corresponding pre-event or post-event return by calculating the difference between the closing price on the day of the event and a particular day within the estimation range. The event modeling system may average the closing prices or the pre-event returns and the post-event returns for each day within the estimation range to determine, on each day within the time range surrounding the event, the average return. From the averaged returns within the estimation range, the event modeling system identifies which of the averaged returns is the highest or lowest—for example, by comparing the absolute value of the averaged returns.

The highest or most notable pre-event or post-event return is compared to the normal return of the particular stock over a threshold period. For example, the normal return may be the return over the last year. If the highest return equals the normal return, then the event does not have an abnormal impact on the particular stock. However, if a difference between the highest return is greater than zero, the event has a positive or negative impact on the particular stock. Therefore, the event modeling system displays the abnormal return of the particular stock associated with the event. In various implementations, the event modeling system also displays a corresponding date of the highest return to indicate the range over which the abnormal return can be realized.

For example, the event modeling system tracks how many days before or after the event the highest return occurs. Therefore, the user can know how many days before or after to purchase or sell the particular stock to realize the estimated abnormal return. In various implementations, the event modeling system may display the highest pre-event abnormal return (indicating the abnormal return due to anticipation of the event) as well as the highest post-event abnormal return resulting from occurrence of the event.

The type of event may be classified by an actual amount of change rather than by an expected change. For example, when evaluating a hypothetical future 0.25% increase in the Federal discount rate, the event modeling system may identify historical occurrences of a 0.25% increase. This may be true even in situations where the abnormal return prior to the event may be more based on the expectation of the rate change, rather than the amount of the actual change. In various implementations, the event modeling system may define another event type based on expectations. For example, an event may be defined as the market expectation, one week ahead of the Federal Reserve Board meeting, of a 0.25% increase in the Federal discount rate. The market expectation may be determined from the expectations, recorded over time, of a particular market watcher.

FIG. 1 is a high-level example block diagram of an event modeling system 100. The event modeling system 100 calculates an estimated abnormal return due to an event occurring. The event modeling system 100 displays abnormal returns to a user upon the user logging in to a web page operated by an entity to view the user's account. In various implementations, the entity may be a financial institutions. A user may log in to a web page using a user device 104-1 or user device 104-2 (collectively, user devices 104). The user device 104 can be a computer, tablet, mobile device, etc., and can connect to the Internet 108 to access an event exposure estimation module 112.

The event exposure estimation module 112 can access a variety of databases to perform estimations of abnormal returns based on an event occurring. The databases include a user parameter database 116. The user parameter database 116 stores information for each user's account including portfolio information, such as financial instruments owned, account total, user demographic information (location, age, etc.), personal rate of return, etc. In various implementations, the event modeling system 100 estimates the abnormal return for stocks within the user's portfolio in response to particular events occurring. Therefore, when a user logs on, the user can see on a portion of the homepage (or another page the user navigates to) the abnormal returns of certain common events against the user's portfolio or a subset of the user's portfolio.

The databases further include an event database 120 storing types of events and corresponding dates on which each event has historically occurred. The event modeling system 100 also includes a historical performance database 124. The event exposure estimation module 112 can obtain performance metrics, such as closing prices, of financial instruments, such as stocks, from the historical performance database 124 to estimate an abnormal return. The event modeling system 100 also includes a range database 128 that stores ranges of time windows over which to identify abnormal returns. The range database 128 may include a corresponding range for each event. As noted previously, depending on the event being analyzed, the range over which the event modeling system 100 should search for an abnormal return may vary as frequently occurring events may benefit from a smaller range so as to not intrude on other events influencing the return.

FIGS. 2A-2B are representations of an example user interface presenting example screens of an event modeling system. FIG. 2A depicts a homepage 200 including a page displayed upon a user logging in. A first portion 204 of the homepage 200 may include information about a stock the user owns, including the current price and percentage change. In various implementations, the first portion 204 may include a view full portfolio button 208 that, upon user selection, directs a web portal to a screen depicting each financial instrument included in the user's portfolio, including prices and historical performance.

A second portion 212 of the homepage may depict event impact on the user's portfolio, listing some common events, such as oil increasing, inflation increasing, and federal interest rate increasing. For each event, the second portion 212 lists an amount increase or decrease indicating the estimated abnormal return on the user's portfolio if the event were to occur and the user's portfolio remains unchanged (that is, the user dos not buy or sell securities in their portfolio). For example, the user's portfolio is estimated to experience an abnormal increase of an additional 3% (on top of any normal return) if the price of oil increases. In various implementations, the events may be more specific, such as including the abnormal return on the user's portfolio if oil price, inflation, or federal interest rate increases by a particular amount.

Additionally, the second portion 212 may include a date range over which the abnormal return is realized. For example, for events that occur at a set or known time, such as the federal interest rate increasing, the anticipation of the event may result in the abnormal return. In various implementations, the second portion 212 may include an indicator of five days before the announcement of the federal interest rate increase. Therefore, if the user expects the federal interest rate to increase and, as shown, the estimated impact on the user's portfolio is realizing a 2% loss, the user may want to sell certain stocks that expose the user's portfolio to the loss. Such additional details may also be included in an event impact page that the user can be directed to upon selection of a more information button 216. In various implementations, the impact on each financial instrument in the user's portfolio may be listed.

FIG. 2B depicts an event impact homepage 250 where the user can use the event modeling system to determine the impact of selectable events on their portfolio as well as specific securities. While the homepage 200 included the second portion 212 with common events, the event impact homepage 250 may include a variety of events in a select event against portfolio portion 254. While only a first event button 258 and a second event button 262 are depicted, the select event against portfolio portion 254 may include a dropdown menu or a scrollbar for the user to select from multiple events against their portfolio. For example, upon selection of the first event button 258, the event modeling system determines the abnormal return, if there is one, that the user's portfolio will realized if the first event occurs.

An impact for a selected stock section 266 allows the user to enter a stock symbol at 270 and select the first event or second event from radio buttons. In various implementations, the user may select more than one radio button to determine the overall impact on their portfolio or a particular stock if two or more events occurring and additional events for selection may be displayed. Upon selection of a calculate impact button 274, the event modeling system determines the abnormal return of the entered stock that will realized if the selected event occurs. In various implementations, if the user believes a particular event is going to occur and the user's portfolio is estimated to realize an abnormal loss, the user may search which stocks will benefit from the particular event to hedge the user's risk. In various implementations, the event modeling system may identify a set of stocks that are estimated to benefit from a common or selected set of events and present the set of stocks to the homepage 200 or the event impact homepage 250.

FIG. 3 is a representation of an example user interface presenting an example account overview screen 300 of an event modeling system for a hypothetical account numbered 1234. The account overview screen 300 includes multiple user-selectable tabs, including a combined accounts tab 304, a current performance tab 308, an abnormal return tab 312, and a link/add account tab 316.

On the abnormal returns tab 312, the screen depicts balance information 320 and a market snapshot area 324 linking the user to potential articles of interest. Further, on the abnormal returns tab 312, the user's portfolio against common market events is depicted at 328, including if: oil prices rise, inflation expectations rise, stock market volatility rises, 10-year U.S. treasury rate rises, U.S. large cap stocks fall, etc. Each event depicted may be a user-selectable button. Upon selection, individual stocks of the user's portfolio may be listed including the abnormal return for the individual stocks as a result of the event occurring as well as how many days before or after the event from which the abnormal return is calculated.

Figure 4:
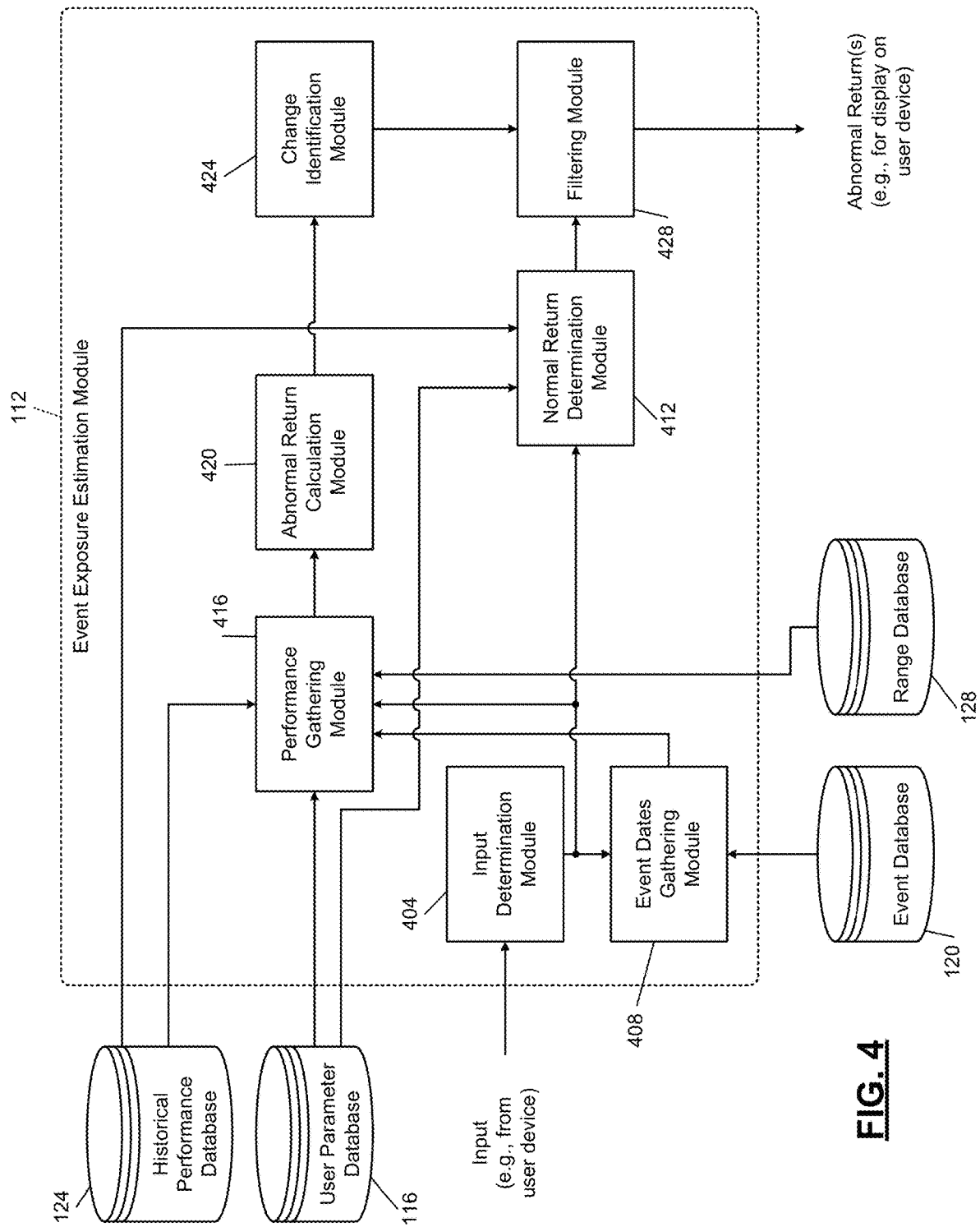
FIG. 4 is an example functional block diagram of an example event exposure estimation module.

FIG. 4 is an example functional block diagram of an example event exposure estimation module 112. The event exposure estimation module 112 receives input from a user device. For example, the input may be a result of user selection of a button, including the user logging in to the user's account (displaying common events against the portfolio), the user selecting a particular event while logged in, the user entering a specific stock symbol and selecting an event, etc. For example, if the user is logging in, an input determination module 404 receives an indication that the user logged in and identifies the type of input as a user login by a corresponding user identifier. The input determination module 404 forwards to an event dates gathering module 408 the user identifier of the user logging in and an indication that the user is logging in.

Based on the input type, the event dates gathering module 408 obtains a set of dates from the event database 120 corresponding to when the previous events occurred. The event database 120 may be manually updated by an analyst to maintain an updated record of events. In this example, when the input type is logging in, the event dates gathering module 408 gathers sets of dates for events identified as common. In various implementations, the user may select which events matter to the user and personalize which events are displayed on the user's homepage. In various implementations, when the user is selecting a particular event, the event dates gathering module 408 will only obtain the set of dates for that particular event.

The input determination module 404 also forwards the input type to a normal return determination module 412 and a performance gathering module 416. The normal return determination module 412 identifies the stock or set of stocks against which an abnormal return is being estimated to calculate a normal return for the stock or set of stocks. To calculate the normal return, the normal return determination module 412 obtains historical performance of the stocks in the user's portfolio (as obtained from the user parameter database 116) or stocks selected by the user from the historical performance database 124 to determine the normal return over a threshold time, for example, the last year.

The event dates gathering module 408 forwards the obtained set or sets of dates to a performance gathering module 416. The performance gathering module 416 also receives the request type from the input determination module 404. That is, the input determination module 404 forwards whether the input is due to the user logging in, etc. If the input type is the user logging in, the performance gathering module 416 obtains stock identifiers within the user's portfolio from the user parameter database 116. Otherwise, if the user selected a particular stock, the stock identifier is included in the input and forwarded the performance gathering module 416.

Based on the event type, as indicated by the input, the performance gathering module 416 obtains a range from the range database 128 corresponding to the event type. For example, if the event is an increase in oil price, the range of time over which to determine if the change in oil price may cause an abnormal return for a particular stock may be smaller than a change in the federal interest rate. Additionally, the range database 128 may store an indication of whether the range should apply to before the event, after the event, or both. Because unexpected events may not result in an abnormal return before the event occurs, while expected events may only result in changes leading up to the event, the event exposure estimation module 112 may limit which time frame is analyzed.

The performance gathering module 416 obtains, for each stock identifier of the portfolio or indicated in the input, historical performance over the range for each event date from the historical performance database 124. In various implementations, the performance gathering module 416 obtains a closing price for each event date of the set of dates and the range surrounding the event date. The closing prices are forwarded to an abnormal return calculation module 420. Each obtained closing price corresponds to a number of days away from the corresponding event date. Therefore, for each day out from the event date, across the set of event dates, an average abnormal return is calculated.

In other words, for an event date, an abnormal return is calculated for one day before the event date, which is a closing price on the event day less a closing price one day before the event date. The abnormal return is calculated for one day before each historical occurrence of the same event. The abnormal return for one day before each historical occurrence of the same event is averaged. The abnormal return calculation module 420 determines the average abnormal return for two days before each historical occurrence of the same event and continues until the average abnormal return is calculated for each day within the range, including days after the event date. In various implementations, the average abnormal return may be weighted (for example, linearly or exponentially) in time to more heavily weigh those abnormal returns that are closer to the corresponding event date.

The set of average abnormal returns are forwarded to a change identification module 424. The change identification module 424 identifies the average abnormal return that results in the largest change. That is, the change identification module 424 determines, for the event, which average abnormal return is the highest or which is the lowest. In various implementations, the change identification module 424 may determine a highest average abnormal return by determining the absolute value of each average abnormal return.

The average abnormal return with the largest change (along with how many days away from the event date the average abnormal return occurs) is forwarded to a filtering module 428. The filtering module 428 compares the normal return of stock or set of stocks (received from the normal return determination module 412) to the average abnormal return with the largest change. If a difference between the normal return less the average abnormal return with the largest change equals zero, then the average abnormal return with the largest change is normal and the event generally does not impact the analyzed stock or portfolio. However, if the difference is nonzero, the average abnormal return with the largest change is displayed to the user device. In various implementations, separate before event and after event abnormal returns may be determined and displayed.

In various implementations, the event exposure estimation module 112 may estimate a single day away from the event, for example, one day before or after, or even 10 days before or after. The range database 128 may include, for each particular event, a specific lookback or lookforward number of days (that is, a specific date a set number of days away from the event) as opposed to a range.

Figure 5A:
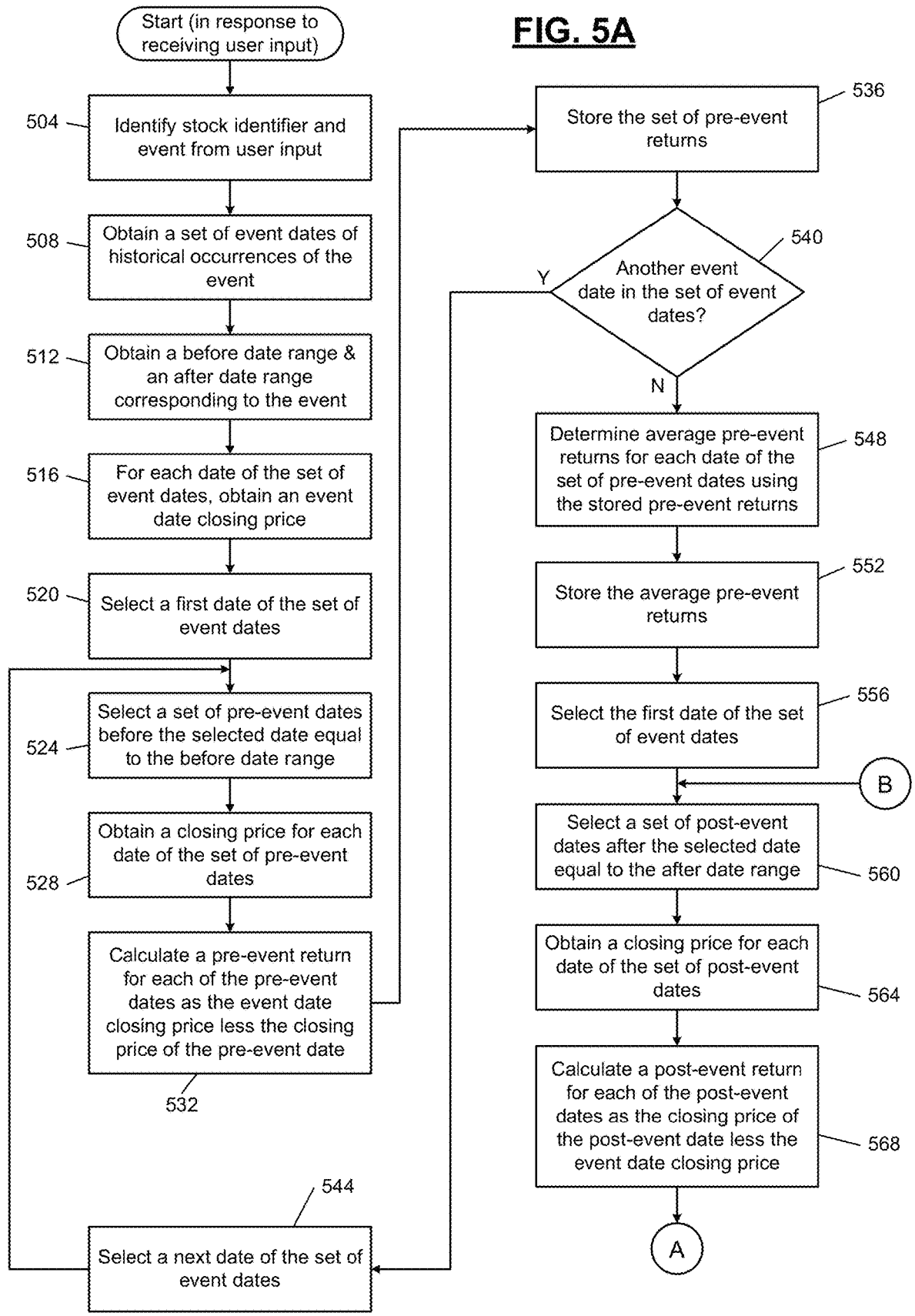
FIGS. 5A-5B together are a flowchart depicting example determination and display of an abnormal return corresponding to occurrence of an event.
Figure 5B:
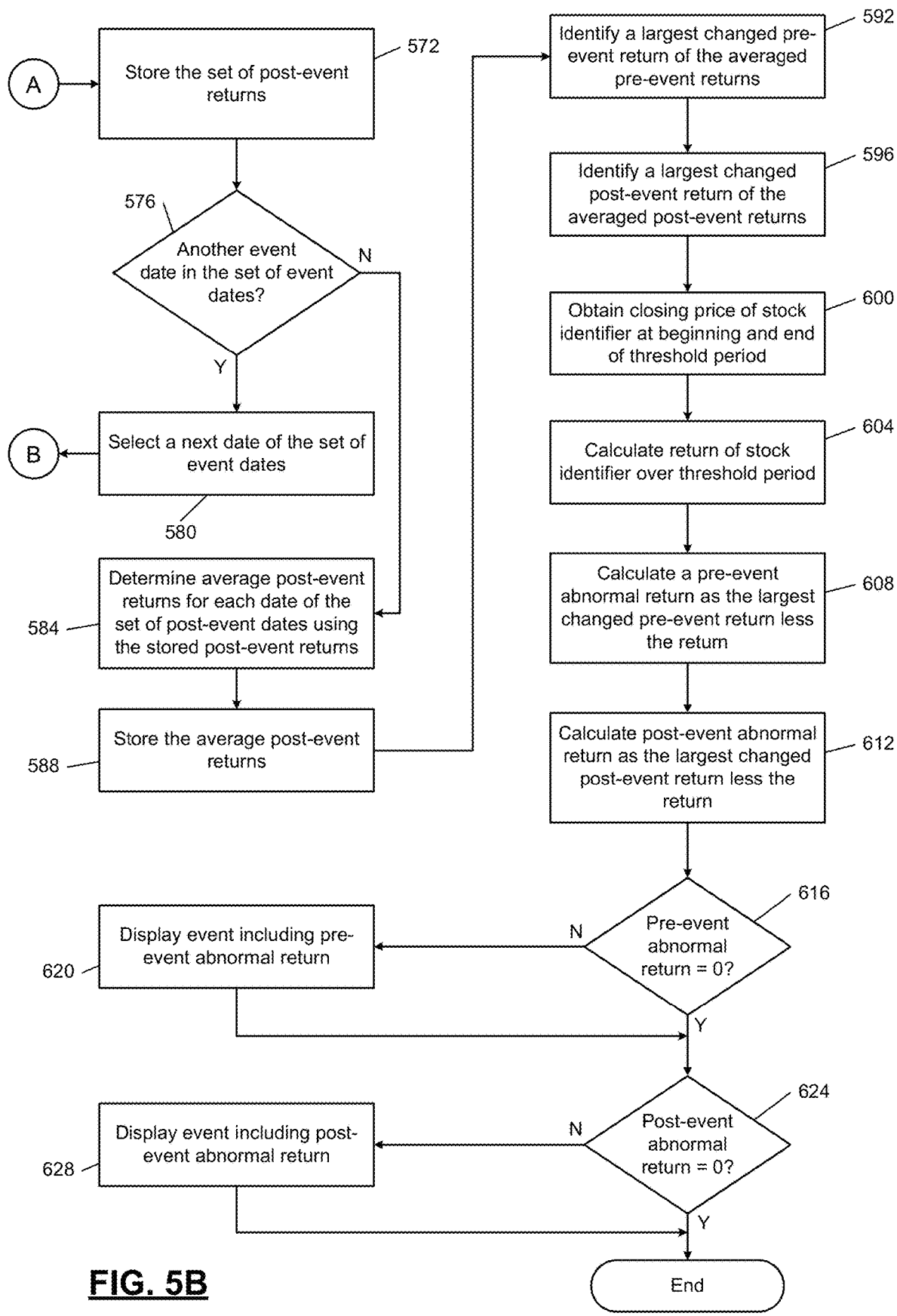

FIGS. 5A-5B are flowcharts depicting example determination and display of an abnormal return due to an event occurring. While a single stock is depicted in the flow chart, a set of stocks or financial instruments included in a portfolio or identified by a user may also be analyzed using the same techniques to identify abnormal returns as the result of an event. Similarly, while FIGS. 5A-5B depict a single event, multiple events may be analyzed.

Control begins in response to receiving user input. Control proceeds to 504 to identify the stock identifier and event from user input. At 508, control obtains a set of event dates of historical occurrences of the event. Control continues to 512 to obtain a before date range and an after date range corresponding to the event. In various implementations, only one date range may be obtained that corresponds to before the event, after the event, or surrounding the event.

Control continues to 516 to, for each date of the set of event dates, obtain an event date closing price. At 520, control selects a first date of the set of event dates. Control proceeds to 524 to select a set of pre-event dates before the selected date that is equal to the before date range. Control continues to 528 to obtain a closing price for each date of the set of pre-event dates. At 532, control calculates a pre-event return for each of the pre-event dates as the event date closing price less the closing price of the pre-event date.

Control continues to 536 to store the set of pre-event returns. Control proceeds to 540 to determine whether another event date is in the set of event dates. If yes, control continues to 544 to select a next date of the set of event dates and returns to 524. Otherwise, if another event date is not in the set of event dates, control continues to 548 to determine average pre-event returns for each date of the set of pre-event dates using the stored pre-event returns. As noted previously, the average may be weighted according to proximity of the pre-event date to the event date, the closer the more heavily weighted.

Control continues to 552 to store the average pre-event returns. Control proceeds to 556 to select the first date of the set of event dates. Control continues to 560 to select a set of post-event dates after the selected date equal to the after date range. Control continues to 564 to obtain a closing price for each date of the set of post-event dates. At 568, control calculates a post-event return for each of the post-event dates as the closing price of the post-even date less the event date closing price.

Control continues to 572 on FIG. 5B to store the set of post-event returns. Control proceeds to 576 to determine whether another event date is in the set of event dates. If yes, control continues to 580 to select a next date of the set of event dates and returns to 560. Otherwise, if control determines there is not another event date in the set of event dates, control proceeds to 584 to determine average post-event returned for each date of the set of post-event dates using the stored post-event returns. Control continues to 588 to store the average post-event returns.

Control proceeds to 592 to identify a largest changed pre-event return of the averaged pre-event returns. That is, control determines which of the stored averaged pre-event returns indicate the largest amount of change. In various implementations, control may determine the absolute value of the averaged pre-event returns and identify the highest pre-event return. Control continues to 596 to identify a largest changed post-event return of the averaged post-event returns. That is, the stored averaged post-event return indicating the largest change, which may also be determined using the absolute value. Control continues to 600 to obtain a closing price of the stock identifier at the beginning and end of a threshold period to calculate a normal return. For example, the threshold period may be one year from a present date to calculate a one-year return.

Control continues to 604 to calculate a return of the stock identifier over the threshold period. Control proceeds to 608 to calculate a pre-event abnormal return as the largest changed pre-event return less the return. Control continues to 612 to calculate a post-event abnormal return as the largest changed post-event return less the return. At 616, control determines if the pre-event abnormal return equals zero. That is, if the return does not differ from the largest changed pre-event return (the difference equals zero), then the event does not cause an abnormal return for the stock or the portfolio. If no, then the difference results in an abnormal return and control continues to 620 to display event including the pre-event abnormal return. In various implementations, control may display a corresponding number of days away the abnormal return is from the event, indicating a number of days before the event at which the pre-event abnormal return is realized. The pre-event abnormal return represents the abnormal return in addition to the normal return. Then, control continues to 624.

Otherwise, if yes, the pre-event abnormal return equals zero, control continues to 624. In various implementations, control may display the event even when the occurrence of the event does not result in an abnormal return. At 624, control determines if the post-event abnormal return equals zero. If no, control continues to 628 to display the event including the post-event abnormal return. In various implementations, control may also display a corresponding number of days the post-event return is from the event. Then, control ends. Otherwise, if the post-event abnormal return equals zero, control ends. In various implementations, control may display the post-event abnormal return when it equals zero.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A system comprising:
   at least one processor and
   a memory coupled to the at least one processor,
   wherein the memory stores,
      a historical performance database including values associated with dates and corresponding to security identifiers;
      an event database including a set of event types and, for each event type of the set of event types, a set of event dates, wherein the event types include market events; and
      instructions that when executed by the at least one processor, in response to receiving user input, cause the system to perform
         identifying, from the user input, a first event type and a first security identifier;
         obtaining, based on the first event type, a first set of event dates from the event database;
         for each event date of the first set of event dates,
            obtaining, from the historical performance database, an event value on the event date of the first security identifier;
            obtaining a related date to the event date, the related date being within a date range of the event date;
            obtaining, from the historical performance database, a value on the related date of the first security identifier;
            determining a difference value, the difference value being a difference between the event value on the event date of the first security identifier and the value on the related date of the first security identifier; and
            storing the difference value in a set of difference values;
         calculating an average difference of the set of difference values; and
         displaying, on a user device, the average difference and an event indicator corresponding to the first event type.

2. The system of claim 1 wherein the instructions that when executed by the at least one processor cause the system to perform:
   obtaining, from the historical performance database, a beginning value of the first security identifier and an end value of the first security identifier;

calculating a normal difference as the end value less the beginning value;

determining an additional return value as the normal difference less the average difference; and in response to the additional return value being nonzero, displaying, on the user device, the additional return value.

3. The system of claim 2 wherein the instructions that when executed by the at least one processor cause the system to perform:

in response to the additional return value being zero, displaying an indication on the user device that the additional return value is equal to the normal difference.

4. The system of claim 2 wherein the instructions that when executed by the at least one processor cause the system to perform:

determining a corresponding average difference for each day of the date range related to each event date of the first set of event dates;

storing the corresponding average difference for each day of the date range in a set of average differences;

identifying a value indicating a largest change from the set of average differences;

determining the additional return value as the normal difference less the value; and in response to the additional return value being nonzero, displaying, on the user device, the additional return value.

5. The system of claim 4 wherein the date range corresponds to the first event type.

6. The system of claim 4 wherein the date range includes a pre-event date range and a post-event date range.

7. The system of claim 1 wherein the first security identifier includes: (i) a stock; (ii) an option; or (iii) an exchanged-traded fund.

8. The system of claim 1 wherein:

the memory stores a user parameter database including a set of security identifiers corresponding to a user of the user device, and the first security identifier includes each security identifier of the set of security identifiers.

9. The system of claim 1 wherein the event type includes: (i) a change in commodity value; (ii) a change in interest rate value; or (iii) an occurrence of a natural disaster.

10. The system of claim 1 wherein receiving the user input includes:

receiving an indication of a user logging in to an account;

identifying the first security identifier as a security included in a corresponding user portfolio; and identifying the first event type as a preset event type.

11. A method comprising:

in response to receiving user input, identifying, from the user input, a first event type and a first security identifier;

obtaining, based on the first event type, a first set of event dates from an event database, wherein the event database includes a set of event types and, for each event type of the set of event types, a set of event dates, wherein the event types include market events;

for each event date of the first set of event dates,
obtaining a related date to the event date, the related date being within a date range of the event date;
obtaining, from a historical performance database, an event value on the event date of the first security identifier, wherein the historical performance database includes values associated with dates and corresponding to security identifiers;
obtaining, from the historical performance database, a value on the related date of the first security identifier;
determining a difference value, the difference value being a difference between the event value on the event date of the first security identifier and the value on the related date of the first security identifier; and
storing the difference value in a set of difference values;

calculating an average difference of the set of difference values; and displaying, on a user device, the average difference and an event indicator corresponding to the first event type.

12. The method of claim 11 further comprising:

obtaining, from the historical performance database, a beginning value of the first security identifier and an end value of the first security identifier;

calculating a normal difference as the end value less the beginning value;

determining an additional return value as the normal difference less the average difference; and in response to the additional return value being nonzero, displaying, on the user device, the additional return value.

13. The method of claim 12 further comprising:

in response to the additional return value being zero, displaying an indication on the user device that the additional return value is equal to the normal difference.

14. The method of claim 12 further comprising:

determining a corresponding average difference for each day of the date range related to each event date of the first set of event dates;

storing the corresponding average difference for each day of the date range in a set of average differences;

identifying a value indicating a largest change from the set of average differences;

determining the additional return value as the normal difference less the value; and in response to the additional return value being nonzero, displaying, on the user device, the additional return value.

15. The method of claim 14 wherein the date range corresponds to the first event type.

16. The method of claim 14 wherein the date range includes a pre-event date range and a post-event date range.

17. The method of claim 11 wherein the first security identifier includes: (i) a stock; (ii) an option; or (iii) an exchanged-traded fund.

18. The method of claim 11 further comprising:

storing a set of security identifiers corresponding to a user of the user device in a user parameter database, wherein the first security identifier includes each security identifier of the set of security identifiers.

19. The method of claim 11 wherein the event type includes: (i) a change in commodity value; (ii) a change in interest rate value; or (iii) an occurrence of a natural disaster.

20. The method of claim 11 wherein receiving the user input includes:

receiving an indication of a user logging in to an account;

identifying the first security identifier as a security included in a corresponding user portfolio; and identifying the first event type as a preset event type.

* * * * *